United States Patent [19]

Dorri

[11] Patent Number: 4,848,311

[45] Date of Patent: Jul. 18, 1989

[54] METHOD AND APPARATUS FOR REDUCING SIDE PANEL HOT SPOTS IN A KITCHEN RANGE

[75] Inventor: Bizhan Dorri, Clifton Park, N.Y.

[73] Assignee: General Electric Company, Schenectady, N.Y.

[21] Appl. No.: 166,949

[22] Filed: Mar. 11, 1988

[51] Int. Cl.⁴ .................. A21B 1/00; F24C 5/00
[52] U.S. Cl. .................. 126/21 R; 126/19 R; 126/42; 126/1 F; 126/198; 165/135
[58] Field of Search .......... 126/42, 1 AD, 1 F, 1 AE, 126/190, 198, 273 R, 273 A, 39 B, 39 C, 98; 110/336, 337, 180; 165/53, 55, 135

[56] References Cited

U.S. PATENT DOCUMENTS

| | | |
|---|---|---|
| 662,874 | 11/1900 | Marshall et al. |
| 1,298,358 | 3/1919 | Kuhn et al. |
| 1,466,941 | 9/1923 | Houze |
| 2,852,933 | 9/1958 | Amundson |
| 3,189,020 | 6/1965 | Getman .......................... 126/190 |
| 3,633,561 | 1/1972 | Barnett et al. ............... 126/273 A X |
| 4,370,973 | 2/1983 | Bolanoa .......................... 126/190 X |
| 4,619,098 | 10/1986 | Taylor . |
| 4,638,615 | 1/1987 | Taylor . |

Primary Examiner—Larry Jones
Attorney, Agent, or Firm—William H. Steinberg; James C. Davis, Jr.; Paul R. Webb, II

[57] ABSTRACT

The temperature of localized high temperature regions in the side panels of a kitchen range is reduced by the use of thermal conduction breaks to interrupt thermal conduction paths and inhibit the transfer of heat from the oven through a supporting frame to the side panels. The thermal conduction breaks comprise a plurality of thin, vertically orientated elongated slits in upper portions of the front faces of the side panels. Heat transfer into the side panels due to radiation from the oven door is reduced by forming the oven door with a plurality of elongated slits disposed about a central portion of the door which closes the oven access opening to interrupt thermal conduction paths from the central portion to peripheral regions of the door adjacent to front faces of the side panels.

10 Claims, 4 Drawing Sheets

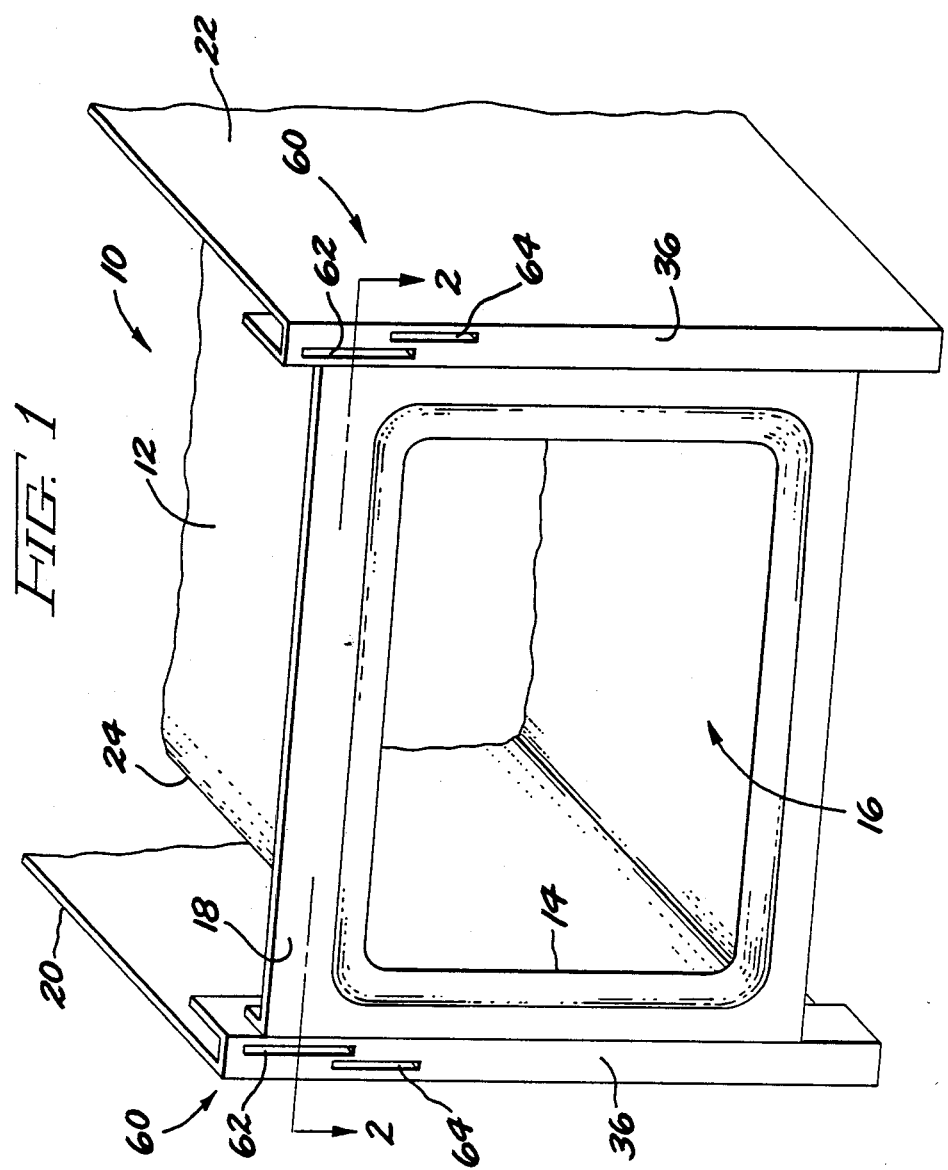

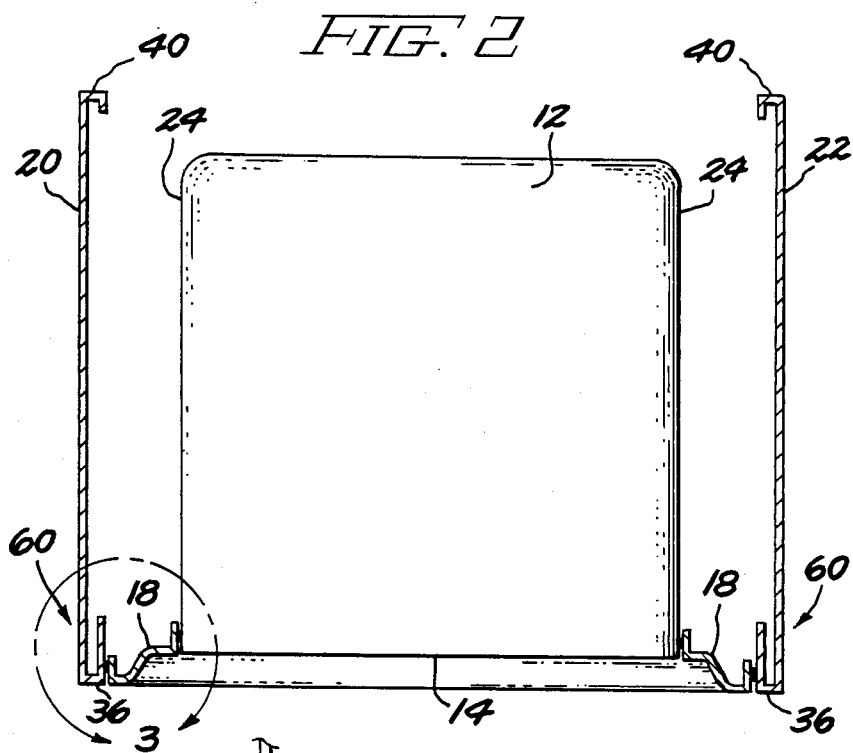
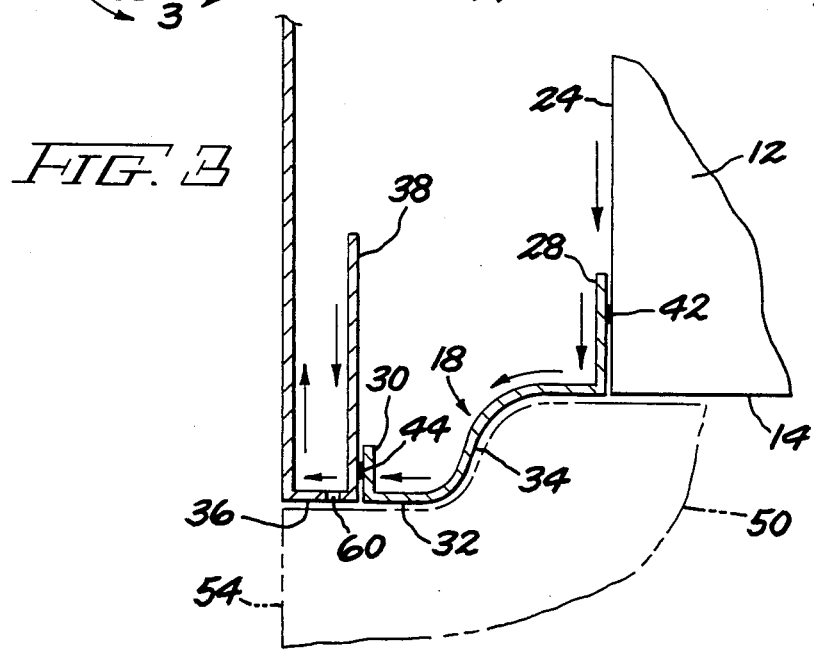

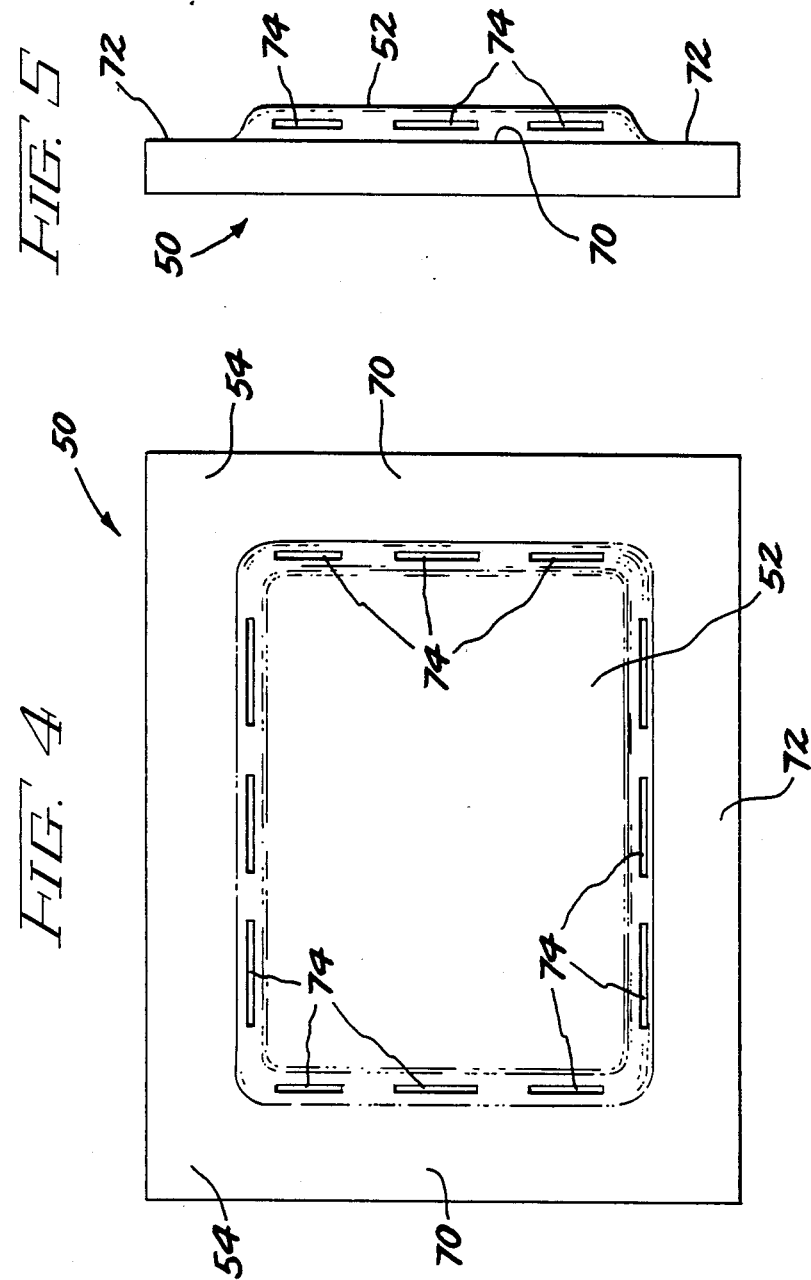

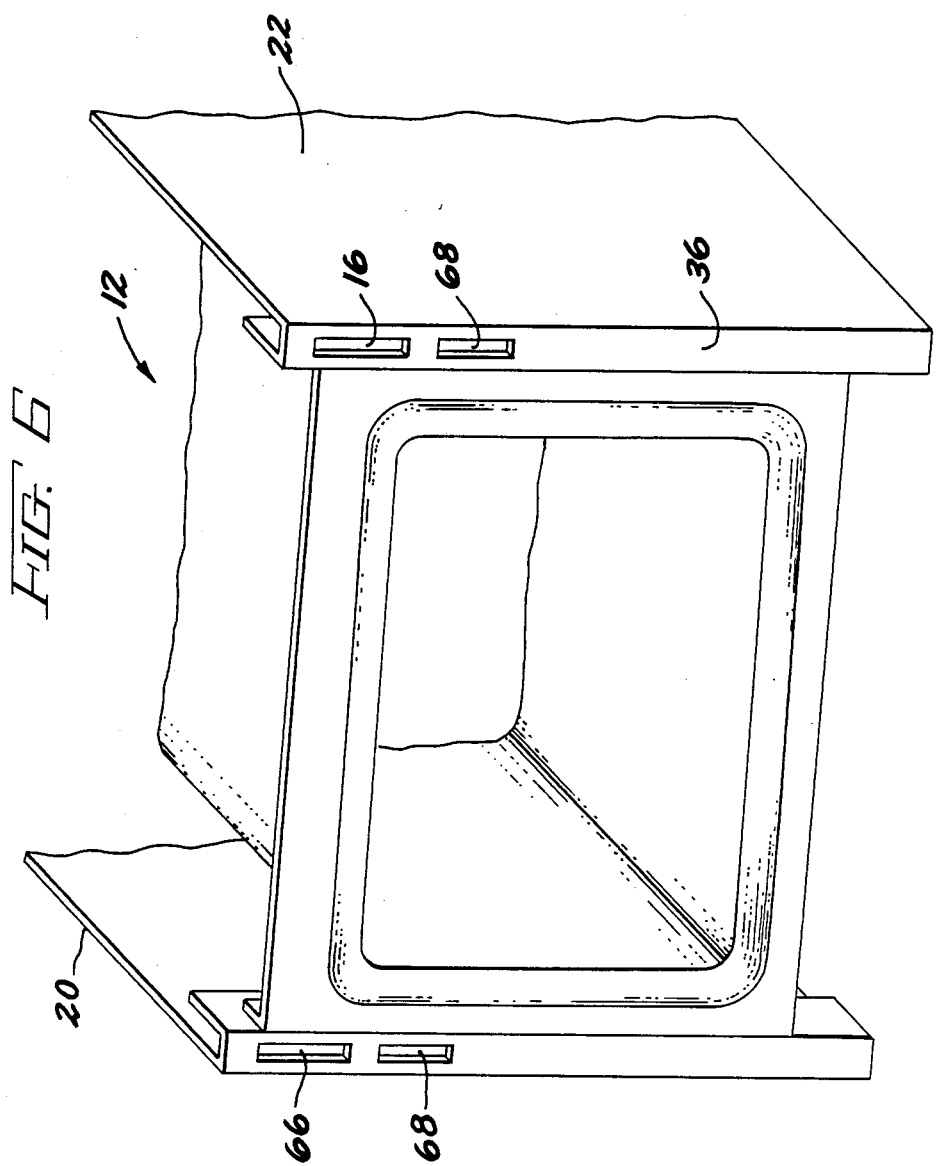

METHOD AND APPARATUS FOR REDUCING SIDE PANEL HOT SPOTS IN A KITCHEN RANGE

BACKGROUND OF THE INVENTION

This invention relates to gas and electric kitchen ranges having an improved construction which reduces the temperature of the range side panels, and particularly the temperature of localized hot spots in the side panels.

Gas and electric kitchen ranges have to comply with a number of different safety codes established by Underwriters Laboratory. One of these is UL 858 which establishes a maximum side panel temperature for the range. Since kitchen ranges are usually built-in with cabinets or other appliances closely adjacent to and often in contact with the side panels, if the side panel gets too hot there is a danger of fire. During a self cleaning cycle, the temperatures within the oven of the range can become quite high and can approach 900° F. This is the operating mode of the range which is most critical in terms of side panel temperature, and the range must be designed so that the side panel temperature does not exceed the allowable maximum during self-cleaning. Normally, this is accomplished by designing the range such that the oven cavity is spaced from the side panels, typically by three to four inches, and covered with a blanket of insulation, typically two to two and a half inches thick, so as to leave an air space between the side panels and the insulation. During a self-cleaning cycle, the surface temperature of the insulation close to the front panel flange of the oven may be as high as 400° F., and the air space helps to reduce heat transferred into the side panels due to convection. Heat is also transferred into the side panels by conduction through the metal frame and front panel of the oven and by radiation from the oven door.

Although this conventional range design is capable of maintaining side panel temperatures within acceptable limits during self-cleaning, it has several disadvantages. It is common, for example, to find localized high temperature regions, or hot spots, in the side panels, where the temperature may exceed the temperature of other regions of the side panels by as much as 40° F. Typically, these hot spots are located in the upper regions of the side panels adjacent to the front of the range. Also, the necessity of spacing the oven cavity from the side panels sufficiently to maintain the side panel temperature below an acceptable maximum temperature limits the size of the oven cavity which can be used in a standard 30 inch side range.

It is desirable to provide a method of reducing side panel temperature in a kitchen range, particularly in a localized region in a side panel, and a range having a construction which accomplishes this, and it is to these ends that the present invention is directed.

SUMMARY OF THE INVENTION

The invention affords a rather simple and easily implemented technique of reducing the temperature in a side panel of a kitchen range, particularly in a localized area, through the use of thermal conduction breaks which interrupt the thermal conduction path into the side panel and inhibit the transfer of heat into the side panel.

Briefly stated, in one aspect, the invention provides a method and an apparatus for reducing the temperature of a localized high temperature region in a side panel of a kitchen range of the type that includes an oven having a front access opening, and a frame connected to the oven adjacent to the front access opening for supporting the oven. The side panel is connected to the frame and extends rearwardly along a side of the oven spaced therefrom. The side panel is connected to the frame and extends rearwardly along a side of the oven spaced therefrom. The side panel has a front face which extends parallel to the front access opening from the side panel to the frame, and the front face has formed therein a plurality of elongated openings to interrupt the thermal conduction path from the frame to the side panel through the front face and to inhibit the transfer of heat to the side panel.

In another aspect, the invention provides a kitchen range of the type described which has a plurality of elongated openings in a front face of first and second side panels of the range which interrupt thermal conduction paths from the frame to the side panels through the front face to inhibit the transfer of heat into the side panels.

In accordance with more specific aspects, the elongated openings in each front face may comprise at least a pair of vertically extending slots or thin slits disposed in the front face between a localized high temperature region of a side panel and the frame. In a preferred form, the openings are offset horizontally from each other and are staggered vertically such that a portion of the two openings overlap. In another form, the openings may be disposed in the front face one above the other. In addition, the oven door of the range which, in a closed position, covers the front face of the side panels and the frame, and has a portion which projects into the opening of the oven cavity to close the oven, is also formed with a plurality of elongated openings about the portion which projects into the oven cavity. The elongated openings, which are also preferably slits, serve as thermal conduction breaks to interrupt the thermal conduction paths between the projecting portion and the portions of the door which cover the front faces in order to reduce the heat transferred from the projecting portion into the covering portions of the door, thereby reducing the heat transferred into the side panels.

Other features and advantages of the invention will become apparent from the description which follows.

BRIEF DESCRIPTION OF THE DRAWINGS

FIG. 1 is a partial perspective view illustrating a portion of a kitchen range in accordance with a first embodiment of the invention;

FIG. 2 is a cross-sectional view taken approximately along the lines 2—2 of FIG. 1;

FIG. 3 is an enlarged cross-sectional view of a portion of FIG. 2;

FIG. 4 is an elevational view of an oven door for the range of FIG. 1 showing the door from the inside;

FIG. 5 is a side elevational view of the oven door FIG. 4; and

FIG. 6 is a partial perspective view similar to FIG. 1 illustrating a range in accordance with another embodiment of the invention.

DESCRIPTION OF THE PREFERRED EMBODIMENTS

FIG. 1 illustrates a portion of a kitchen range 10 in accordance with a first embodiment of the invention. FIG. 1 does not show a complete range, but only the lower portion which includes the oven. The figure does not illustrate, for instance, the top portion of the range which would be mounted on the lower portion illustrated in the figure in a conventional manner and which would include burners and operating controls. The figure also does not illustrate all of the components or structural elements of the lower portion, but only so much of the structure as is necessary to an understanding of the present invention. In the figure, the lower portion of the range is shown with the oven door removed. The oven door, which is illustrated in FIGS. 4 and 5, may be pivotally mounted in a conventional manner on the front of the range for closing the oven. Range 10 may be either an electric or a gas kitchen range of the type normally employed for household cooking, and may have a self-cleaning cycle for cleaning the oven.

As shown in FIG. 1, range 10 may comprise an oven enclosure 12 having a generally rectangular front opening 14 providing access to an oven cavity 16, a front frame member 18 as of steel, for example, which surrounds the oven adjacent to opening 14, and left and right substantially vertical side panels 20 and 22, respectively, which extend rearwardly from the front frame substantially parallel to and spaced from the side walls 24 of the oven, as best illustrated in FIG. 2.

As shown in FIGS. 2 and 3, frame 18 may comprise a member which is stamped or otherwise shaped to provide an inner rearwardly extending flange 28 and an outer rearwardly extending flange 30 which are connected by an outer face portion 32 which extends substantially parallel to the plane of opening 14 and a smoothly rearwardly curved portion 34 which connects the face portion 32 to the flange 28. The side panels, which may be of sheet metal, are also formed to have a front face 36 which extends inwardly from the side panel toward the face portion of the frame parallel to the oven opening and in substantially the same plane as the face portion, and to have an inner flange 38 which extends rearwardly from the front face. The rear portions 40 of the side panels may be formed to have a shape similar to their front portions, as shown in FIG. 2.

Referring to FIG. 3, the inner flange 28 of frame 18 may be connected to the outer wall of oven 12 as by spot welding, one such spot weld 42 being illustrated in the figure, and the outer flange 30 of the frame may be connected to flange 38 of the side panel by spot welding, as shown at 44. As shown in FIG. 3, the frame is connected to the side panels and to the oven such that the front face 36 of the side panel and face portion 32 of the frame are in the same plane parallel to the plane of the oven opening 14, and such that the curved portion 34 of the frame provides a smoothly curved surface between the plane of the oven opening and face portion 32. This serves to recess the oven opening slightly rearwardly from the plane of the faces. As will be explained in more detail shortly, and as shown in FIGS. 4 and 5, the oven door 50 may be formed to have a central generally rectangular projecting portion 52 on its inside surface. Projecting portion 52 may be shaped and sized to fit within the recess formed by curved portion 34 of the frame when the door is mounted on the range in order to close the oven opening 14, as shown in phantom lines in FIG. 3. Also, the projecting portion may have a gasket (not illustrated) around it to engage the frame and prevent heat transfer through the space between the door and the frame.

Frame 18 serves to support both the oven and the side panels, and the frame, the side panels, and the oven may be connected to other supporting members (not illustrated in the figures). In addition, the frame serves to space the side panels from the oven sidewalls 24. Typically, this spacing may be of the order of 3 to $3\frac{1}{2}$ inches, and the outer surfaces of the oven may be covered with a blanket of aluminum foil-faced insulation (not shown) having a thickness of the order of 2 to $2\frac{1}{2}$ inches. This leaves an air gap between the insulation and the side panels. The insulation and air gap serve to insulate the side panels from the heat generated within the oven when it is in use and reduce the heat transfer to the side panels due to connection. Nevertheless, during a self-cleaning cycle the temperature within the oven cavity may reach 900° F., and it has been found that the surface of the insulation near the front frame and the top of the range may reach as high as 400° F. Heat is transferred from the oven to the side panel through the front frame by conduction, as indicated by the arrows in FIG. 3, by convection, and from the oven door by radiation as from the portion 54 of the oven door which covers the front face 36 of the side panel when the oven door is closed, as shown in FIG. 3.

The ranges of the type described, it has been found that the temperatures in certain localized regions of the side panel may exceed the temperature in other regions of the side panel by as much as 40° F. thereby resulting in a localized "hot spot" in the side panel. The region of the side panel in which the most severe hot spot has been found to exist is the region near the top of the side panel adjacent to its front face, which is indicated generally by the reference numeral 60 in the figures. This is believed to be due, in part, to the fact that the heat transferred into the side panel is higher in this region due to conduction through the frame and radiation from the door, and in part due to the fact that since the area between the interior of the side panel and the oven is more restricted, there is less air flow in this region and, consequently, less cooling.

In accordance with the invention, it has been found that the temperature in region 60 of the side panels can be reduced substantially by providing thermal conduction breaks in the front face of the side panel adjacent to the region to interrupt the thermal conduction paths through the front face and inhibit the transfer of heat to the side panel. The thermal conduction breaks may comprise one or more narrow elongated openings or slots which are formed in the front face of the side panels adjacent to region 60. FIGS. 1 and 6 illustrate two alternative forms which the openings may have.

In FIG. 1, the thermal conduction breaks may comprise a pair of thin vertically oriented upper and lower slits 62 and 64, respectively, which are staggered horizontally by a small distance and positioned in front face 36 such that a small portion of the two slits overlap in the vertical direction, as shown. The slits, which extend completely through the front face, may be of the order of 20 mils wide. Slit 62 may be located, for example, approximately $\frac{1}{8}$ inch below the top of the side panel and have a length of the order of 5 inches. Slit 64 should be spaced (horizontally) fairly close to slit 62, e.g., $\frac{1}{2}$ inch. Slit 64 may have a length of the order of $3\frac{1}{2}$ inches, and the vertical overlap of slits 62 and 64 may be of the order of 1 inch. This arrangement will effectively cut the thermal conduction paths through the frame and front face to the side panel, and inhibit the transfer of heat through the front face into region 60.

As shown in FIG. 6, the thermal conduction breaks may comprise a pair of somewhat wider upper and lower slots 66 and 68, respectively, which are positioned one above the other in the front face of each side panel, as shown. The two slots may have a width of the order of ¼ inch and may be spaced vertically by ¼ inch or less. Slot 66 may have a length of the order of 4 inches, and slot 68 may have a length of the order of 3 inches.

In order to test the effectiveness of the invention in reducing localized hot spots, an electric range having a structure similar to that shown was instrumented with several thermocouples on the outer surface of its side panels. Three thermocouples were located in the regions 60 at 1¼, 4 and 7¼ inches, respectively, from the top of each side panel and approximately ¼ inch away from the front face 36 of the side panels. First baseline temperature measurements were made on the range without any openings in the front faces of its side panels. Next, the measurements were repeated with two slots in the front face of only the right side panel 22. The slots were as illustrated in the embodiment of FIG. 6 and had the previously given dimensions and spacing. The results of the measurements are indicated in the following Table 1. In the table, the three thermocouples on the left side panel are designated TC2, TC4 and TC6, respectively, while the three thermocouples on the right side panel are designated TC28, TC29, and TC30, respectively. As indicated in Table 1) the ambient temperature was different for the two sets of measurements. Accordingly, Table 2 gives the results obtained for the right side panel with the baseline measurements adjusted to take into account the ambient temperature difference.

TABLE 1

| | | Experimental Results | |
|---|---|---|---|
| | TC # | °F. Baseline (no slots) | °F. With 2 Slots (on right side) |
| Left side | TC 2 | 139 ± 1 | 145 ± 1 |
| | TC 4 | 137 ± 1 | 142 ± 1 |
| | TC 6 | 142 ± 1 | 147 ± 1 |
| Right side | TC 28 | 141 ± 1 | 130 ± 1 |
| | TC 29 | 140 ± 1 | 129 ± 1 |
| | TC 30 | 145 ± 1 | 132 ± 1 |
| | Ambient Temp. °F. | 72 | 76 |

TABLE 2

| | | Interpretation of Results | | |
|---|---|---|---|---|
| | TC # | °F. Without Slots (Adjusted) | °F. With 2 Slots | T: Reduction in Temp. °F. |
| Right Side | TC 28 | 146 ± 1 | 130 ± 1 | 16 |
| | TC 29 | 145 ± 1 | 129 ± 1 | 16 |
| | TC 30 | 150 ± 1 | 132 ± 1 | 18 |

From Table 1, the measurements indicated a maximum baseline temperature of 142° F. for the left side panel (TC 6) and 145° F. for the right side panel (TC 30). As indicated in Table 2, after adjustment of the results to compensate for the ambient temperature difference, the maximum temperature drop in the right side panel afforded by the slots was 18° F. for thermocouple TC 30, which demonstrates that the invention is capable of affording a substantial reduction in the temperature of localized high temperature regions.

It was anticipated that the use of side slots such as illustrated in FIG. 6, would not only interrupt the thermal conduction path through the front face of the side panel but would also afford better convective air flow around the hot spot area. It was found, however, that thin slits such as illustrated in FIG. 1 afforded slightly better results. This is believed to be due to the fact that the wider slots provided a window which allowed heat radiated from the oven door to impinge upon the inner surface of the side panel. The slightly better performance obtained using a thin slit, such as shown in FIG. 6, indicates that improving air convection around a hot spot is not as important in reducing the hot spot temperature as is interrupting the thermal conduction path through the frame to the side panel.

The temperature in the front portion of the side panels, such as region 60, can also be reduced by reducing the amount of heat which is radiated into the side panels from the oven door. This may be accomplished by reducing the temperature of the oven door adjacent to the side panels, and FIGS. 4 and 5 illustrate an oven door construction for this purpose. As previously described, oven door 50 includes a projecting portion 52 on its inside which is formed to enter the recessed area in the front frame to close the oven opening. Preferably, the oven door comprises a one-piece construction which is shaped as illustrated in FIGS. 4 and 5 to provide the central projecting portion 52. When the oven door is closed, heat is conducted outwardly from the central projecting portion 52 to the peripheral side regions 70 of the door, and conducted to the upper and lower peripheral regions 72 of the door. When the door is closed, the side panel faces and frame are covered by portion 54 of the door (see FIG. 3) and the side peripheral regions 70 of the door are adjacent to the front faces 36 of the side panels. This allows the heat radiated from the side peripheral regions to enter the side panels.

It is desirable to reduce the heat transferred to the side panels by radiation. This may be accomplished by reducing the temperature of the peripheral regions of the door by using thermal conduction breaks to interrupt the thermal conduction paths from projecting portion 52 to the peripheral regions. As shown in FIGS. 4 and 5, the sides of the projecting portion 52 of the door may be formed with a plurality of thin slits 74 which surround the projecting portion. The thin slits serve as thermal conduction breaks to interrupt the thermal conduction paths from the central portion 52 into the peripheral regions of the door, and thereby lower the temperature in the peripheral regions. As a result, less heat is radiated into the side panels.

While preferred embodiments of the invention have been shown and described, it will be apparent to those skilled in the art that changes can be made in these embodiments without departing from the principles and spirit of the invention, the scope of which is defined in the appended claims. It will be appreciated, for example, that different configurations and arrangements of openings from those disclosed may be employed as thermal conduction breaks.

What is claimed is:

1. A method of reducing the temperature of a localized high temperature region in a side panel of a kitchen range of the type which includes an oven having a front access opening, a frame connected to the oven adjacent to the front access opening for supporting the oven, and side panels being connected to the frame and extending rearwardly along sides of the oven and being spaced therefrom, each side panel having a front face which extends between the side panel and the frame substantially parallel to the front access opening, the method comprising forming in the front face of each side panel, adjacent to said localized high temperature region, a plurality of elongated openings arranged as thin vertically oriented slits having a width of the order of 20 mils to interrupt a thermal conduction path from the frame to the side panel through the front face to inhibit heat transfer to the side panel.

2. The method of claim 1, wherein there is a pair of slits in each front face, and the slits are staggered in a horizontal direction and overlap in a vertical direction.

3. The method of claim 1, wherein said forming comprises forming the openings as a pair of vertically oriented slots spaced one above another in the front face.

4. The method of claim 1, wherein the range further includes a door pivotally mounted on the range and having a central projecting portion for closing the oven access opening and having peripheral regions which are located adjacent to and cover the front faces when the door is in a closed position, and wherein the method further comprises forming a plurality of elongated of elongated slits about the central projecting portion to interrupt thermal conduction paths from the central projecting portion to the peripheral regions.

5. Apparatus for reducing the temperature of a localized high temperature region in a side panel of a kitchen range comprising an oven having a front access opening; a frame connected to the oven adjacent to the front access opening for supporting the oven, and the side panel being connected to the frame and extending rearwardly along a side of the oven and being spaced therefrom, the side panel having a front face which extends between the side panel and the frame substantially parallel to the front access opening, and the front face having formed therein adjacent to said localized high temperature region, elongated openings formed as thin vertically oriented slits having a width of the order of 20 mils, and a length of several inches to interrupt a thermal conduction path from the frame to the side panel through the front face to inhibit heat transfer to the side panel.

6. The apparatus of claim 5, wherein the slits are offset from one another in horizontal direction and overlap in a vertical direction.

7. The apparatus of claim 5, wherein the front face has a pair of openings formed as vertically oriented slots spaced one above another.

8. A method of reducing the temperature of a localized high temperature region in a side panel of a kitchen range of the type which includes an oven having a front access opening, a frame connected to the oven adjacent to the front access opening for supporting the oven, and side panels being connected to the frame and extending rearwardly along sides of the oven and being spaced therefrom, each side panel having a front face which extends between the side panel and the frame substantially parallel to the front access opening, a door pivotally mounted on the range and having a central projecting portion for closing the oven access opening and having peripheral regions which are located adjacent to and cover the front faces when the door is in a closed position, and wherein the method comprises forming a plurality of elongated slits about the central projecting portion to interrupt thermal conduction paths from the central projecting portion to the peripheral regions so that radiational heating of the localized high temperature region in the side panel by the peripheral regions of the door is reduced.

9. Apparatus for reducing the temperature of a localized high temperature region in a side panel of a kitchen range comprising an oven having a front access opening; a frame extending about the front access opening for supporting the oven; first and second side panels extending rearwardly along the opposite sides of the oven and spaced therefrom, each side panel having a front face which extends between the side panel and the frame in a plane substantially parallel to the front access opening and is connected to the frame, an oven door having a central region formed to close the oven access opening and having peripheral side regions formed to cover the front faces of the side panels when the door is in a closed position, the door having a plurality of thin elongated slits formed therein between the central region and the peripheral side regions to interrupt thermal conduction paths and inhibit the transfer of heat from the central region to the peripheral side regions so that radiational heating of the front faces of the side panels by the peripheral side regions of the oven door is reduced.

10. The range of claim 9, wherein the oven access opening is recessed from the frame, and the central region of the door projects beyond a plane in which the peripheral side regions of the door are located, and wherein the elongated openings in the door are formed about the projecting central region.

* * * * *